United States Patent [19]
Herndon

[11] Patent Number: 4,955,625
[45] Date of Patent: Sep. 11, 1990

[54] SWIVEL WHEEL WHEELBARROW

[76] Inventor: George W. Herndon, 806 N. Dawson St., Thomasville, Ga. 31792

[21] Appl. No.: 364,891

[22] Filed: Jun. 12, 1989

Related U.S. Application Data

[63] Continuation-in-part of Ser. No. 185,486, Apr. 25, 1988, Pat. No. 4,854,601.

[51] Int. Cl.$^5$ ............................................... B62B 1/18
[52] U.S. Cl. .................................................. 280/47.31
[58] Field of Search ................. 280/47.11, 47.3, 47.31, 280/47.32

[56] References Cited

U.S. PATENT DOCUMENTS

| | | | |
|---|---|---|---|
| 546,091 | 9/1895 | Davis | 280/47.32 |
| 2,235,041 | 3/1941 | Ronning | 280/47.11 |
| 2,235,042 | 3/1941 | Ronning | 280/47.11 |
| 2,492,157 | 12/1949 | Riviere | 280/47.11 |
| 2,518,032 | 8/1950 | Lewis | 280/47.31 |
| 2,606,771 | 8/1952 | Rehnberg | 280/42 |

FOREIGN PATENT DOCUMENTS

| | | | |
|---|---|---|---|
| 630114 | 9/1978 | U.S.S.R. | 280/47.11 |
| 253382 | 6/1926 | United Kingdom | 280/47.32 |

OTHER PUBLICATIONS

The "Swivel Wheel Wheelbarrow," 1958, George W. Herndon, Copyright Registration No. A376952.
Improved Swivel-Wheel Wheelbarrow, 1961, George W. Herndon.

Primary Examiner—Charles A. Marmor
Assistant Examiner—Tamara L. Finlay
Attorney, Agent, or Firm—Weston, Hurd, Fallon, Paisley & Howley

[57] ABSTRACT

A swivel wheel wheelbarrow includes a pair of spaced beams that project forwardly from a tray. The wheel is supported by a fork from which a post extends. The lower end of the post is connected to the beams by a lower yoke support, and the upper end of the post is connected to the beams by an upper yoke support. The lower and upper yoke supports are maintained in a stationary position in order to provide optimum support for the wheel. In an alternative embodiment of the invention, a lock is provided for the post. When the lock is engaged, the wheel is locked in a wheel-straight position; when the lock is disengaged, the wheel can pivot freely about the post.

29 Claims, 5 Drawing Sheets

SWIVEL WHEEL WHEELBARROW

BACKGROUND OF THE INVENTION

REFERENCE TO RELATED PATENT

The present application is a continuation-in-part of application Ser. No. 185,486, filed Apr, 25, 1988, by George W. Herndon, now U.S. Pat. No. 4,854,601.

FIELD OF THE INVENTION

The invention relates to single-wheeled portable vehicles and, in particular, to such vehicles having a swivel-mounted wheel.

DESCRIPTION OF THE PRIOR ART

A conventional wheelbarrow has a bowl, or tray, supported atop a support structure that includes handles, legs, and a single wheel. In order to make it turn, the operator either must tilt the wheelbarrow in the direction of the turn or he must move the rear of the handles around and align the vehicle with the desired direction before proceeding in the new direction. When the wheelbarrow is loaded, particularly if the load is unstable, it can be extremely difficult to turn the wheelbarrow. Although various proposals have been made to provide a more maneuverable vehicle by employing some type of castering arrangement for the wheel, none of these efforts have been fully successful.

Early approaches to the problem are shown in U.S. Pat. No. 2,235,041 and U.S. Pat. No. 2,235,042, both issued on Mar. 18, 1941 to A. Ronning. The Ronning patents each disclose a manually propelled single wheel vehicle in which the wheel is swivel-mounted. Control cables are connected to the wheel and to hand grips included as part of the vehicle's handles. Rotation of the handles causes the wheel to be swiveled in one direction or the other, thereby changing the vehicle's path of travel. Unfortunately, the devices are exceedingly complex and, it is believed, difficult to operate.

Another approach is shown in U.S. Pat. No. 2,606,771, issued Aug. 12, 1952 to A.E. Rehnberg. Rehnberg discloses a collapsible combination wheelbarrow and automobile trailer. A single wheel is attached to a casting, which in turn is attached to collapsible tubing extending from a cargo-carrying container. The geometry of the various components is such that the wheel is poorly supported. The device functions primarily as an automobile trailer and only incidentally as a manually powered wheelbarrow.

Other approaches are known in which a castered wheel is connected to the tray by means of a pair of pipes or a triangular plate. Although these devices are less complex, and therefore more desirable, than prior devices such as those disclosed in the Ronning patents, they still fail to address certain problems. One of those problems relates to properly positioning the wheel relative to the tray such that the vehicle has desirable handling characteristics. Another problem not addressed is that of properly supporting the wheel so that it will withstand heavy loads.

Desirably, a swivel wheel wheelbarrow would be simple in construction and very strong, and yet would have good handling and maneuverability characteristics. Preferably the wheel construction would be such that it could be used with trays of various configurations. Also, it would be desirable if the wheelbarrow could be assembled from inexpensive, readily available components.

SUMMARY OF THE INVENTION

The present invention provides a new and improved swivel wheel wheelbarrow that addresses the foregoing concerns. The invention employs a support structure atop which a tray or bowl of any suitable configuration is disposed. The support structure includes spaced beams that extend forwardly of the tray. A wheel is connected to the ends of the beams by means of a wheel fork having a post, and upper and lower yoke supports. The lower yoke support is connected directly to the beams, while the upper yoke support is connected to the beams by means of a cap or braces. The lower and upper yoke supports thus are maintained in a stationary position.

In the preferred embodiment, bearings connect the post to the lower and upper yoke supports so that the swiveling action of the wheel is made easier. In an alternative embodiment, a sleeve is fitted about the post. The sleeve includes laterally extending studs to which the cap or braces are secured.

The invention also includes an embodiment wherein the swiveling action of the wheel can be controlled selectively. A lock is provided for the post. When the lock is engaged, the wheel is locked in a wheel-straight position; when the lock is disengaged, the wheel can pivot freely about the post. The lock is activated by a control bar that is readily accessible to the user.

Because the wheel and its support structure are not connected to the tray, trays of various configurations can be used. Moreover, an optimum geometrical relationship among the various components of the support structure can be attained. Because the upper end of the post is rigidly connected to the beams, the wheel is supported in an exceedingly strong, yet simple manner. The invention thus provides a strong wheelbarrow that is relatively inexpensive and which has desirable handling and reliability characteristics.

The foregoing and other features and advantages of the invention will be apparent from reviewing the following description and claims, taken in conjunction with the accompanying drawings.

DESCRIPTION OF THE PREFERRED EMBODIMENT

Figure 1:
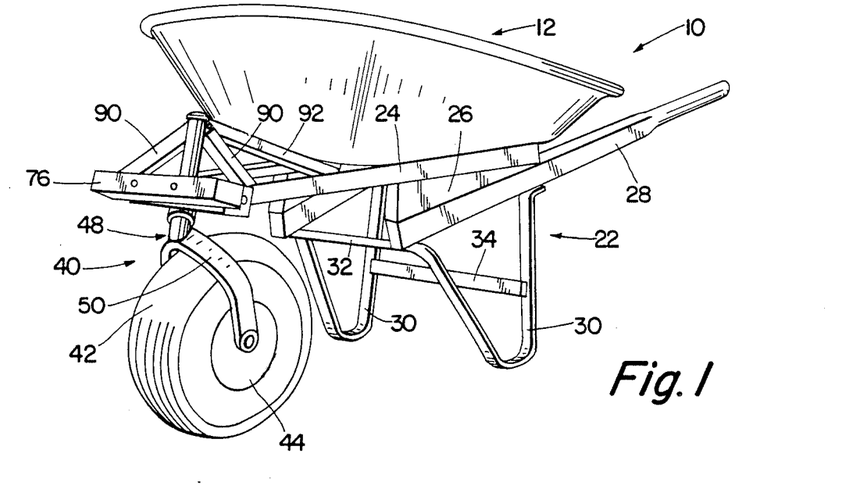
FIG. 1 is a perspective view of a swivel wheel wheelbarrow according to the invention.
Figure 2:
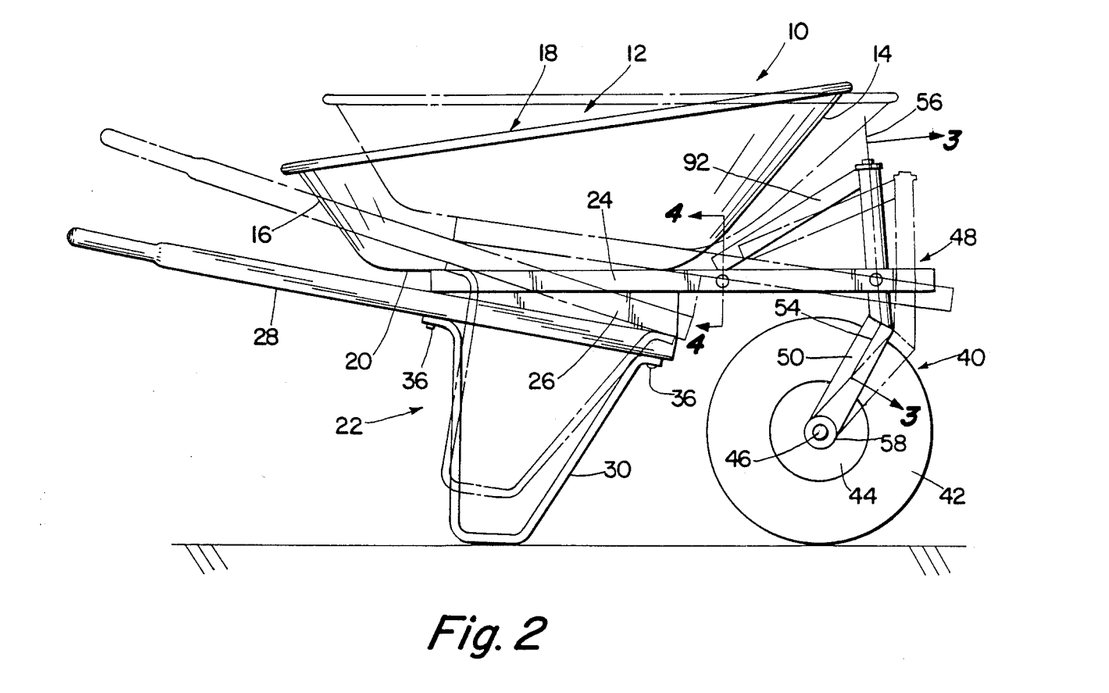
FIG. 2 is a side elevational view of the wheelbarrow of FIG. 1, in which the solid lines show the wheelbarrow in a resting position, and the phantom lines show the wheelbarrow in a raised position.

Referring to FIGS. 1 and 2, a swivel wheel wheelbarrow according to the invention is indicated generally by the reference numeral 10. The wheelbarrow 10 includes a tray 12. The tray 12 includes a front end 14, a rear end 16, an upper surface 18, and a lower surface 20. The tray 12 typically is made of metal, but it also can be fabricated from a plastics material. Also, the tray 12 can assume other configurations, if desired.

Figure 4:
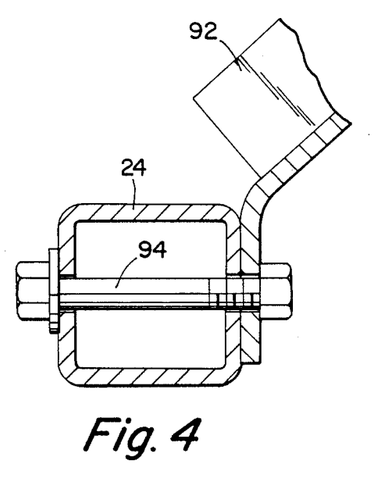
FIG. 4 is a view taken along a plane indicated by line 4—4 in FIG. 2, showing how a brace is connected to a beam.

The tray 12 is disposed atop, and secured to, a support structure 22. The support structure 22 includes a pair of spaced beams 24 that project from the front end 14. The beams 24 are spaced relatively far apart toward the rear end 16, and converge toward each other forwardly of the front end 14. The beams preferably are made of steel having a square cross-section (FIG. 4). A wedge, or riser 26, is disposed beneath each of the beams 24. A handle 28 is disposed beneath each of the risers 26 and extends rearwardly beyond the rear end 16. A first leg 30 is disposed beneath each of the handles 28. The legs 30 are connected by laterally extending braces 32, 34. Together, the legs 30 and the braces 32, 34 define a stand for supporting the wheelbarrow 10 in a resting position. The tray 12, beams 24, risers 26, handles 28, and legs 30 are rigidly connected to each other by means of various bolted fasteners such as those indicated in FIG. 2 by the reference numeral 36. In all of the embodiments disclosed herein, braces (not shown) can be connected between the beams and the tray in order to provide additional stability for the beams, if desired.

The wheelbarrow 10 also includes a wheel assembly 40 that is connected to the support structure 22. The wheel assembly 40 includes a pneumatic tire 42 fitted to a wheel 44 that is supported for rotation by an axle 46 and bearings (not shown). The wheel 44 is carried by a wheel fork 48. The fork 48 includes spaced, parallel second legs 50 and a post 52 (FIGS. 3 and 5) projecting from the legs 50. The legs 50 define a longitudinally extending axis indicated by the reference numeral 54 in FIG. 2. Similarly, the post 52 defines a longitudinal axis indicated by the reference numeral 56. Preferably the obtuse angle between the axes 54, 56 is approximately 145 degrees. The axle 46 extends through openings formed near the ends of the legs 50 and is secured in place by means of washers 58 and hitch lugs (not shown). The wheel 44 rotates about an axis perpendicular to the axis 54.

Figure 3:
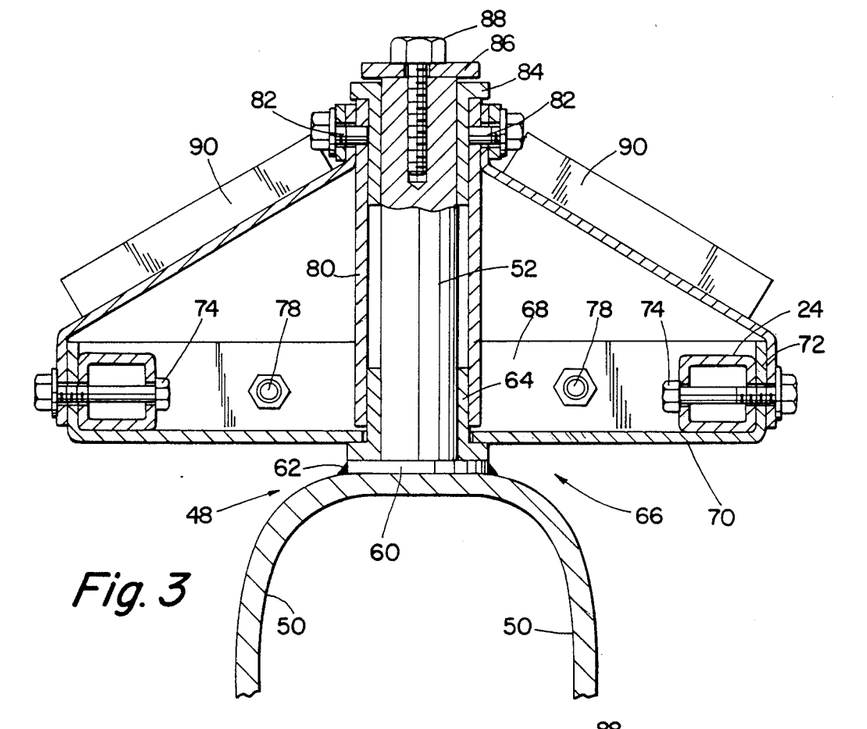
FIG. 3 is a view taken along a plane indicated by line 3—3 in FIG. 2, showing one way in which the wheel can be connected to the remainder of the wheelbarrow.
Figure 5:
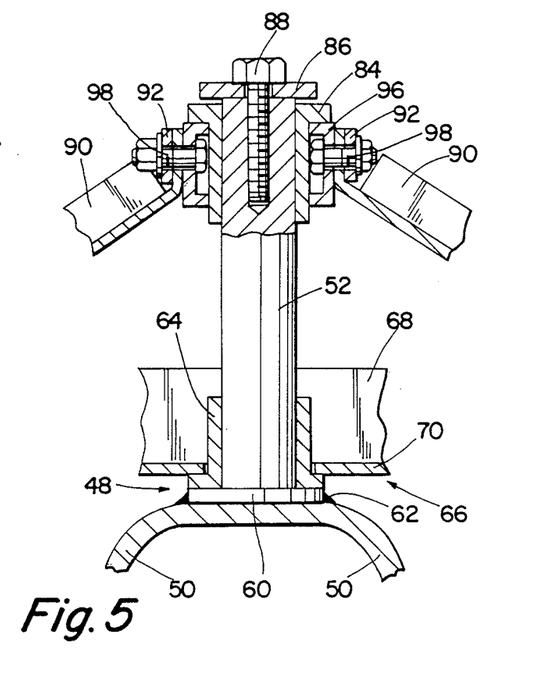
FIG. 5 is a view similar to FIG. 3, in which another technique for connecting the wheel to the remainder of the wheelbarrow is illustrated.

Referring now to FIGS. 3 and 5, a bearing seat in the form of a washer 60 is disposed about the post 52 near the intersection between the legs 50 and the post 52. For convenience, that end of the post 52 will be referred to as the lower portion of the post, while the end of the post 52 removed from the legs 50 will be referred to as the upper portion. The washer 60 is secured to the legs 50 by a circumferential weld indicated at 62. A flanged, sleeve-like bearing 64, preferably made of bronze, is fitted about the lower portion of the post 52 and engages the upper surface of the washer 60. A lower yoke support 66 in the form of an angle iron having a vertical portion 68 and a horizontal portion 70 is disposed about the lower portion of the post 52 and engages the upper surface of the flanged bearing 64. The horizontal portion 70 includes upturned ends 72 to which the beams 24 are rigidly secured by means of bolted fasteners 74. Because the ends of the beams are constrained by the vertical wall 68, the horizontal wall 70, and the upturned ends 72, the connection between the beams 24 and the lower yoke support 66 is quite strong. A bumper 76 (FIG. 1) is secured to the front face of the vertical wall 68 by means of bolted fasteners 78.

Referring particularly to FIG. 3, a less preferred embodiment of the invention is shown. A cylindrical sleeve 80 is disposed about the post 52 and includes laterally projecting studs 82 near its upper portion. A flanged, sleeve-like bearing 84, preferably made of bronze, is fitted about the upper portion of the post 52. The flanged portion 10 of the bearing 84 rests atop the end of the sleeve 80. A washer 86 is disposed atop the bearing 84, and a bolt 88 is threaded into an opening formed in the upper portion of the post 52. The length of the post 52 is such that a small gap exists between the bearing 84 and the washer 86.

Matched pairs of braces 90, 92 are connected at one end to the studs 82. The forwardmost braces 90 are connected at their other end to the beams 24 at the intersection between the beams 24 and the lower yoke support 66. The connection is made by means of the bolted fasteners 74. The other braces 92 are connected to the beams 24 at a location intermediate the lower yoke support 66 and the tray 12. The connection is made by means of bolted fasteners 94 (FIG. 4). The studs 82 and the braces 90, 92 define an upper yoke support that maintains the upper portion of the post 52 in a stationary position relative to the tray 12. Although the upper and lower portions of the post 52 are prevented from moving fore and aft relative to the tray 12, the bearings 64, 84 permit the post 52 to be pivoted about the longitudinal axis 56.

An alternative embodiment of the invention is illustrated in FIG. 5. This embodiment of the invention is similar to the previously described embodiment, with the exception that the sleeve 80 has been eliminated and replaced by means of a collar 96 through which bolts 98 project laterally. The braces 90, 92 are connected to the bolts 98 in the same manner as they are connected to the studs 82. The alternative embodiment of the invention has the advantage of being slightly lighter and less expensive than the first-described embodiment.

In operation, when the wheelbarrow 10 is lifted to the raised position as shown in FIG. 2, the post 52 is approximately vertical. In this position of the post 52, the legs 50 are inclined approximately 45 degrees to the rear from a vertical extension of the longitudinal axis 56. This angular relationship between the post 52 and the legs 50 has been found to produce good handling characteristics while retaining adequate strength. When it is desired to move the wheelbarrow 10 from place to place, the wheel assembly 40 quickly casters to that position shown in FIGS. 1 and 2. When it is desired to change the direction of travel of the wheelbarrow 10, it is necessary only that the operator apply sideways force to the handles 28. The wheelbarrow 10 will quickly change direction due to the swiveling nature of the wheel assembly 40.

Referring now to FIGS. 6—11, an alternative embodiment of the invention is illustrated. The alternative embodiment illustrated in FIG. 6—11 employs many of the components from the embodiment illustrated in FIGS. 1—5, and like reference numerals will be used where appropriate. The principal difference between the embodiment of FIGS. 1—5 and FIGS. 6—11 is that the latter embodiment employs a locking mechanism 100 to control swiveling of the wheel assembly 40 about the axis 56. When the locking mechanism 100 is engaged, the wheel assembly 40 is locked in a wheel-straight position; when the locking mechanism 100 is disengaged, the wheel assembly 40 can pivot freely about the axis 56.

Figure 6:
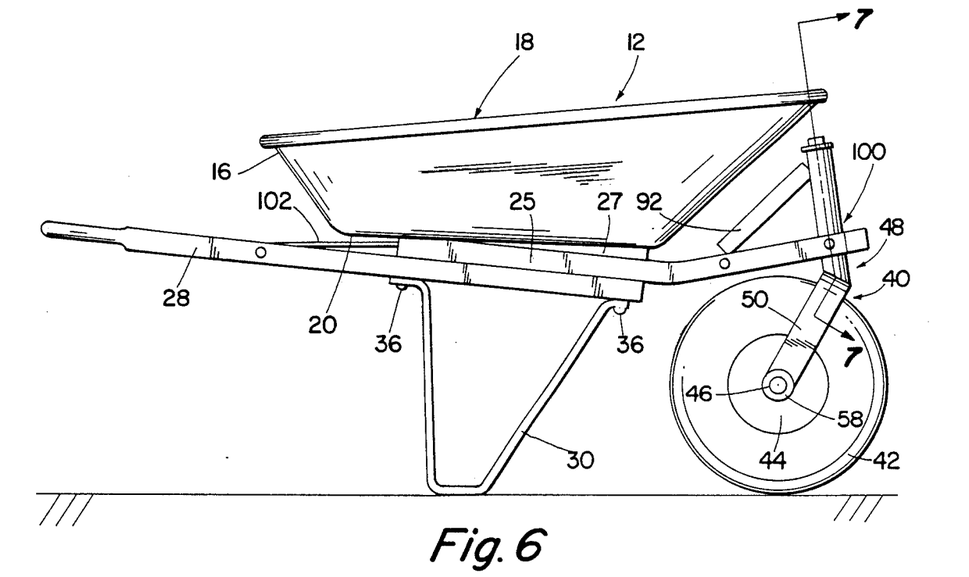
FIG. 6 is a side elevational view of an alternative embodiment of a swivel wheel wheelbarrow according to the invention.
Figure 7:
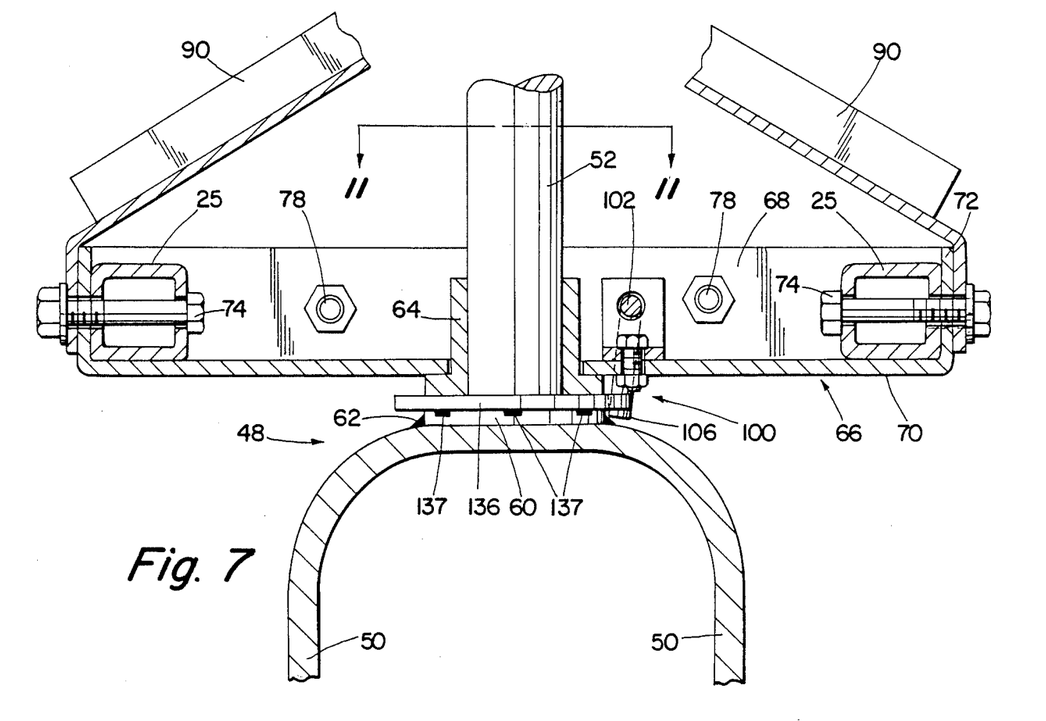
FIG. 7 is a view taken along a plane indicated by line 7—7 in FIG. 6, showing a portion of a locking mechanism for the wheel.
Figure 8:
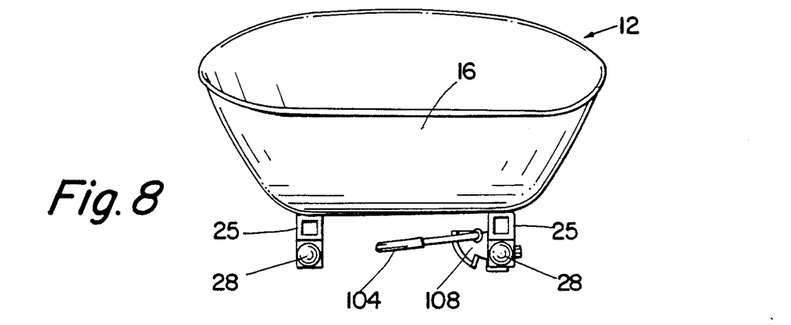
FIG. 8 is a rear elevational view of the wheelbarrow of FIG. 6.
Figure 9:
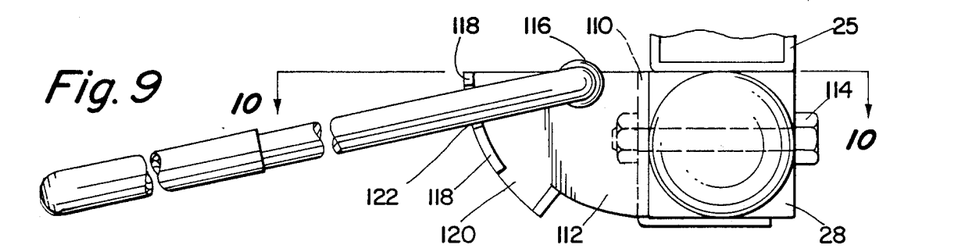
FIG. 9 is an enlarged view of a portion of the wheelbarrow of FIG. 8, showing another portion of the locking mechanism.

Referring particularly to FIG. 6, the beams 24 have been replaced by beams 25. The beams 25 are similar to the beams 24, except that instead of being straight, the forwardmost portion of the beams 25 is inclined upwardly at an angle to the horizontal. The forwardmost portion of the beams 25 forms an obtuse angle of about 165° with the rear portion of the beams 25. Instead of the wedge, or riser 26, a smaller riser 27 is employed with the embodiment illustrated in FIGS. 6-11. The riser 27 is disposed intermediate the upper surface of the beams 25 and the lower surface 20 of the tray 12. The handles 28 are secured to the underside of the beams 25.

The locking mechanism 100 includes an elongate control rod 102 having a handle 104 at one end and a lug 106 at the other end. Due to the particular arrangement of the beams 25 and the risers 27, the tray 12 is spaced relative to the beams 25 such that the rod 102 can be maintained straight, or substantially straight, throughout its length.

A bracket 108 is secured to the right-side handle 28 at a location close to the rear end 16 of the tray 12. The bracket 108 includes a first section 110 from which a second section 112 projects at right angles. The section 110 is held in firm engagement with the right-side handle 28 by means of a bolt 114. The section 112 includes an opening 116 through which the control rod 102 extends. The section 112 also includes several tabs 118 at its periphery that are bent rearwardly. The tabs 118 are spaced so as to provide openings 120, 122 between them. A spring 124 is fitted about the control rod 102 and is compressed in place against the forward surface of the section 112. The rod 102 includes projecting portions 126 that bear against at the end of the spring 124 in order to effect compression.

Figure 10:
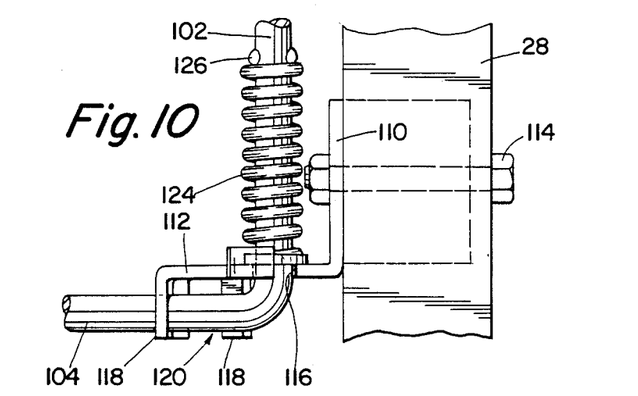
FIG. 10 is a view taken along line 10—10 in FIG. 9, showing yet another view of a portion of the locking mechanism.
Figure 11:
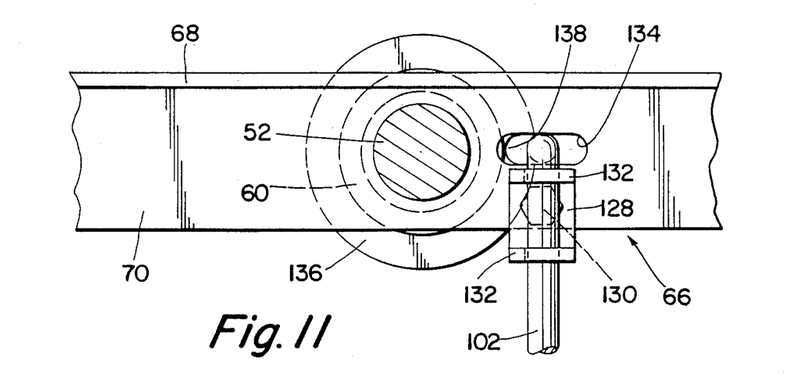
FIG. 11 is a view taken along a plane indicated by line 11—11 in FIG. 7, showing another portion of the locking mechanism.
Figure 12:
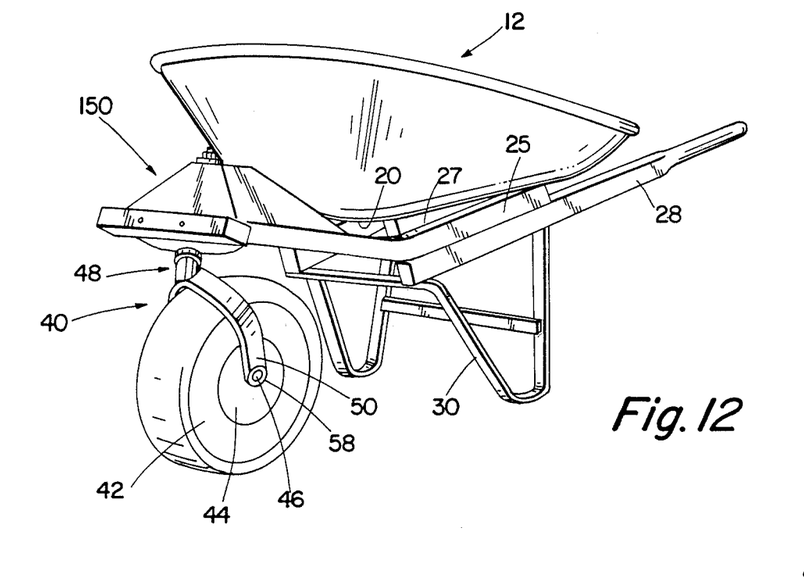
FIG. 12 is a perspective view of an embodiment of the invention showing a preferred upper yoke support.
Figure 13:
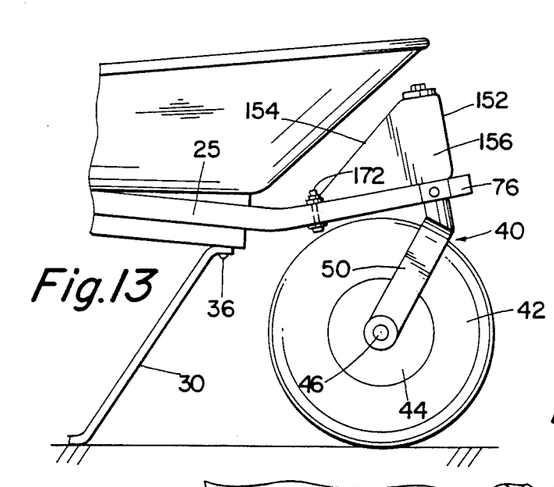
FIG. 13 is a side elevational view of the front portion of the wheelbarrow of FIG. 12.
Figure 14:
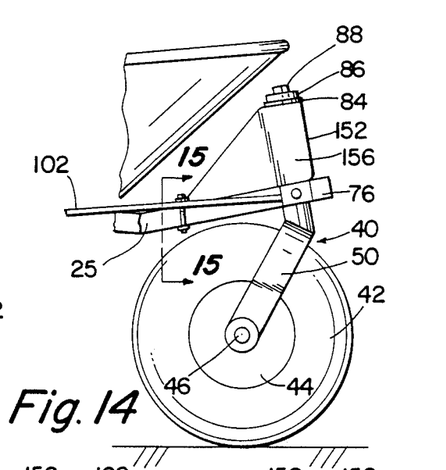
FIG. 14 is a view similar to FIG. 13, with portions of the wheelbarrow being broken away and removed in order to show a portion of the locking mechanism for the wheel.

As will be apparent from an examination of FIG. 10, the spring 124 causes the handle 104 to be tightly urged into contact with the rearward face of the section 112. Accordingly, the handle 104 will be locked within either of the openings 120, 122. In order to move the handle 104 from one of the openings 120, 122 to the other, it will be necessary for the operator to apply a rearward force to the handle 104, and then pivot the handle 104 about the longitudinal axis defined by the control rod 102. Upon releasing axial force from the handle 104, the spring 124 will cause the handle 104 to be tightly held in place within the selected opening. The other end of the control rod 104 is secured to the lower yoke support 66. The connection is made by a U-shaped bracket 128 that is secured to the horizontal portion 70 by means of a bolted fastener 130. The bracket 128 includes a pair of upstanding legs 132 having aligned openings through which the rod 102 extends. The horizontal portion 70 also includes a laterally-extending, elongate slot 134 through which the lug 106 extends.

A large-diameter washer 136 is disposed about the post 52 near the intersection between the legs 50 and the post 52. The washer 136 is larger in diameter than the washer 60 and is secured to the washer 60 by means of spot welds 137. Accordingly, the washer 136 is non-rotatable relative to the legs 50 and the post 52. The outer periphery of the washer 136 includes a radially-extending slot 138 (FIG. 11) adapted to receive the lug 106. The slot 138 is radially-arranged relative to the post 52 such that when the lug 106 is disposed within the slot 138, the wheel assembly 40 will be maintained in a wheel-straight position, that is, the plane in which the wheel 44 rotates will be parallel to the longitudinal axis of the wheelbarrow.

In operation, when the handle 104 is placed within the slot 122 (FIG. 9), the lug 106 will be inserted into the slot 138 and the washer 136 will be prevented from rotating. In turn, the wheel assembly 40 will be prevented from rotating about the axis 56 of the post 52. When the operator moves the handle 104 to the slot 120 against the pressure of the spring 124, the lug 106 will be removed from the slot 138, and the wheel assembly 40 will be free to swivel about the axis 56.

As will be apparent from the foregoing description, the lug 106 constitutes a first member that is connected to the horizontal portion 70 of the lower yoke support 66. The lug 106 is movable laterally toward and away from the wheel fork 48 while being maintained in a stationary axial position. The washer 136 constitutes a second member that is rigidly connected to the wheel fork 48 for movement therewith. The first member, or lug 106, is movable between two positions—a first position where the first and second members (lug 106 and washer 136) are engaged and pivoting of the wheel fork 48 is prevented, and a second position where the first and second members are disengaged and pivoting of the wheel fork 48 is permitted. The operation of the locking mechanism 100 is facilitated by virtue of the washer 136 having a diameter that extends radially beyond the wheel fork 48, and by virtue of the washer 136 having a circular outer diameter. Accordingly, the lug 106 can be brought into engagement with the outer diameter of the washer 136 while the wheel assembly 40 is in a non-straight position. The lug 106 can be pressed against the outer diameter of the washer 136 under the influence of the spring tension inherent in the control rod 102. Whenever the wheel assembly 40 assumes a wheel-straight position, the lug 106 will be forced into the slot 138, thereby preventing further rotation of the wheel fork 48 and locking the wheel assembly 40 in a wheel-straight position.

Referring now to FIGS. 12-16, another embodiment of the invention is illustrated. The embodiment illustrated in FIGS. 12≧16 is identical to the embodiment of FIGS. 6-11, except that the upper yoke support is defined by a cap 150. The cap 150 has the overall shape of a truncated pyramid or a prism. The cap 150 includes a front wall 152, a rear wall 154, side walls 156, and a top wall 158. An opening 160 is formed in the top wall 158. In forming the opening 160, it is preferred that a portion of the opening be downturned, so as to form a small, annular flange that extends into the volume defined by the walls 152, 154, 156, 158.

Figures 15, 16:
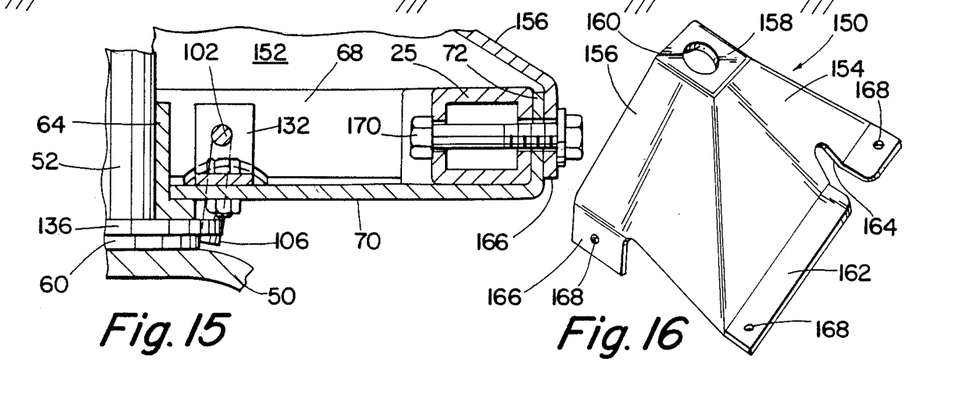
FIG. 15 is a view taken along a plane indicated by line 15—15 in FIG. 14.
FIG. 16 is a perspective view of the preferred upper yoke support according to the invention.

A ledge 162 extends rearwardly from the rear wall 154. A slot 164 is formed in the rear wall 154 and the ledge 162. A tab 166 extends downwardly from each of the side walls 156 near the intersection of the front wall 152 and the side walls 156. The ledge 162 and the tabs 166 include a plurality of openings 168.

The cap 150 is connected to the beams 25 by means of bolts 170 and 172 that extend through the openings 168. The upper end of the post 152 extends through the opening 160, where it is supported for pivoting movement by the bearing 84. As in the embodiment illustrated in FIGS. 3 and 5, a washer 86 is secured to the upper end o the post 52 by means of a bolt 88. The downturned flange included as part of the opening 160 provides good support for the bearing 84. The slot 164 enables the control rod 102 to extend into the interior of the cap 150 for connection to the lower yoke support 66 as described previously (see FIG. 15).

The cap 150 can be made of metal such as aluminum, in which case it can be formed quickly and inexpensively in a stamping or casting operation. The cap 150 also can be manufactured from a high-density plastics material in a molding operation such as injection molding. Regardless of the material from which the cap 150 is manufactured, and regardless of the manufacturing technique, the cap 150 forms an upper yoke support that is exceedingly strong and reliable. The cap 150 is easily installed and forms a preferred replacement for the braces 90, 92. The cap 150 covers the front portions of the beams 25 and the wheel assembly 40, thereby assisting in preventing dirt or debris from interferring with operation of the wheelbarrow 12. Also, the cap 150 presents a clean, attractive appearance that should enhance consumer acceptance of the invention.

As is apparent from the foregoing description, trays of various configurations can be attached to the support structure 22. Also, known components such as handles, risers, and legs can be used with the support structure 22. Because the wheel-supporting post 52 is rigidly connected to the beams 24, 25 both at its upper and lower ends, the wheel 44 is supported in an exceedingly strong, yet simple manner. In the locking embodiment of the invention, the wheel assembly 40 easily can be locked in a wheel-straight position or permitted to swivel freely. The foregoing advantages are attained by a relatively inexpensive construction that produces desirable handling and reliability characteristics.

Although the invention has been described in its preferred form with a certain degree of particularity, it will be understood that the present disclosure of the preferred embodiment has been made only by way of example and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. Support structure for a single-wheeled portable vehicle, comprising:

spaced beams;

a wheel fork having spaced legs defining a longitudinal axis and a post projecting from the legs, the post defining a longitudinal axis about which the wheel fork can pivot, the post including a lower portion adjacent the legs and an upper portion removed from the legs;

a lower yoke support rigidly connected to, and extending laterally between, the beams, the lower yoke support being connected to the lower portion of the post;

an upper yoke support spaced from the lower yoke support and connected to the upper portion of the post and the beams; and means for selectively preventing the wheel fork from pivoting about the longitudinal axis of the post, said means including a first member connected to the lower yoke and a second member connected to the wheel fork, the first member being movable laterally toward and away from the wheel fork while being maintained in a stationary axial position, and the second member being maintained rigidly connected to the wheel fork for movement therewith, the first member being movable from a first position where the first and second members are engaged and pivoting of the wheel fork is prevented to a second position where the first and second members are disengaged and pivoting of the wheel fork is permitted.

2. The support structure of claim 1, wherein the second member is a washer, the washer including a radially extending slot opening through its periphery, and the first member is a lug insertable into the slot, the lug being maintained stationary relative to the longitudinal axis of the post when the lug is inserted into the slot.

3. The support structure of claim 2, further comprising a control rod connected to the lug, the control rod adapted to selectively move the lug into and out of the slot.

4. The support structure of claim 2, wherein teh washer includes a circular outer diameter against which the lug can be pressed during pivoting of the wheel fork.

5. The support structure of claim 1, wherein the upper yoke support includes a sleeve fitted over the post, the sleeve including laterally projecting studs.

6. The support structure of claim 1, wherein the upper yoke support includes a collar secured to the upper end of the post.

7. The support structure of claim 1, wherein the upper yoke support includes a cap secured to the upper end of the post.

8. The support structure of claim 7, wherein the cap includes generally pyramidally-shaped walls that are connected to the beams.

9. The support structure of claim 1, wherein the upper yoke support is connected to the beams by means of braces.

10. The support structure of claim 9 wherein the braces include a first pair of braces connected to the beams at the intersection between the lower yoke support and the beams, and a second pair of braces connected to the beams at a location removed from the lower yoke support.

11. The support structure of claim 1, wherein the angle between the longitudinal axis of the legs and the longitudinal axis of the post is approximately 145°.

12. The support structure of claim 1, further including bearings connecting the post to the lower yoke support and the upper yoke support.

13. The support structure of claim 1, wherein the second member has a circular outer diameter and a radially extending slot opening through the periphery thereof for receiving the first member, the first member being engageable with the outer diameter of the second member during pivoting of the wheel fork.

14. A wheelbarrow, comprising:
a tray, the tray having a front end, a rear end, an upper surface, and a lower surface;
handles connected to the tray and projecting from the rear end of the tray;
first legs connected to the tray and projecting from the lower surface of the tray;
spaced beams connected to the lower surface of the tray and projecting from the front end of the tray;
a wheel fork having spaced second legs defining a longitudinal axis and a post projecting from the second legs, the post defining a longitudinal axis, the post having a lower portion adjacent the legs and an upper portion removed from the second legs;
a wheel connected to, and mounted between, the second legs for rotational movement about an axis perpendicular to the longitudinal axis of the second legs;
a lower yoke support rigidly connected to, and extending laterally between, the beams, the lower yoke support being connected to the lower portion of the post;
an upper yoke support spaced from the lower yoke support and connected to the upper portion of the post;
the lower yoke support and the upper yoke support permitting the wheel fork to pivot about the longitudinal axis of the post;
means connected between the upper yoke support and the beams for maintaining the upper yoke support in a stationary position relative to the tray; and
means for selectively preventing the wheel fork from pivoting about the longitudinal axis of the post, said means including a first member connected to the lower yoke and a second member connected to the wheel fork, the first member being movable laterally toward and away from the wheel fork while being maintained in a stationary axial position, and the second member being maintained rigidly connected to the wheel fork for movement therewith, the first member being movable from a first position wherein the first and second members are engaged and pivoting of the wheel fork is prevented to a second position where the first and second members are disengaged and pivoting of the wheel fork is permitted.

15. The wheelbarrow of claim 14, wherein the second member is a washer, the washer including a radially extending slot opening through its periphery, and the first member is a lug insertable into the slot, the lug being maintained stationary relative to the longitudinal axis of the post when the lug is inserted into the slot.

16. The wheelbarrow of claim 15, further comprising an elongate control rod connected to the lug for inserting the lug into, and removing the lug from, the slot.

17. The wheelbarrow of claim 16, wherein the control rod extends the length of the wheelbarrow for attachment to a selected one of the handles.

18. The wheelbarrow of claim 17, further comprising a bracket secured to a selected one of the handles, the bracket adapted to receive and support the control rod, the bracket including means for maintaining the control rod in one of two selected positions where the lug is engaged with the slot or the lug is not engaged with the slot.

19. The wheelbarrow of claim 15, wherein the washer includes a circular outer diameter against which the lug can be pressed during pivoting of the wheel fork.

20. The wheelbarrow of claim 14, wherein the upper yoke support is in the form of a sleeve fitted over the post, the sleeve including laterally projecting studs.

21. The wheelbarrow of claim 14, wherein the upper yoke support is in the form of a collar secured to the upper end of the post.

22. The wheelbarrow of claim 14, wherein the upper yoke support is in the form of a cap secured to the upper end of the post.

23. The wheelbarrow of claim 22, wherein the means connected between the upper yoke support and the beams is in the form of walls included as part of the cap.

24. The wheelbarrow of claim 14, wherein the means for maintaining the upper yoke support in a stationary position is in the form of braces connected between the upper yoke support and the beams.

25. The wheelbarrow of claim 24, wherein the braces includes a first pair of braces connected to the beams at the intersection between the lower yoke support and the beams, and a second pair of braces connected to the beams at a location intermediate the lower yoke support and the tray.

26. The wheelbarrow of claim 14, wherein the angle between the longitudinal axis of the legs and the longitudinal axis of the post is approximately 145°.

27. The wheelbarrow of claim 14, wherein the position of the post relative to the tray is such that the longitudinal axis of the post is approximately vertical when the wheelbarrow is in a raised position.

28. The wheelbarrow of claim 14, further including bearings connecting the post to the lower yoke support and the upper yoke support.

29. The wheelbarrow of claim 14, wherein the second member has a circular outer diameter and a radially extending slot opening through the periphery thereof for receiving the first member, the first member being engageable with the outer diameter of the second member during pivoting of the wheel fork.

* * * * *